(No Model.)

J. A. BARBER.
STANCHION.

No. 327,753. Patented Oct. 6, 1885.

WITNESSES:
Thos. Houghton.
W. K. Stevens.

INVENTOR:
Jackson A. Barber
BY Munn & Co
ATTORNEYS.

UNITED STATES PATENT OFFICE.

JACKSON A. BARBER, OF NORTH ADAMS, MICHIGAN.

STANCHION.

SPECIFICATION forming part of Letters Patent No. 327,753, dated October 6, 1885.

Application filed November 13, 1884. Serial No. 147,890. (No model.)

*To all whom it may concern:*

Be it known that I, JACKSON A. BARBER, a citizen of the United States, residing at North Adams, in the county of Hillsdale and State of Michigan, have invented certain new and useful Improvements in Cattle-Stanchions, of which the following is a description.

This invention relates to that class of devices used for securing cattle in stables; and it has for its object to secure the cattle quickly, to secure them so that they may turn their necks from side to side with freedom while standing or lying down, and to secure large or small cattle with the same stanchions.

To this end my invention consists in the construction and combination of parts forming a cattle-stanchion, hereinafter described and claimed, reference being had to the accompanying drawings, in which—

Figure 1:
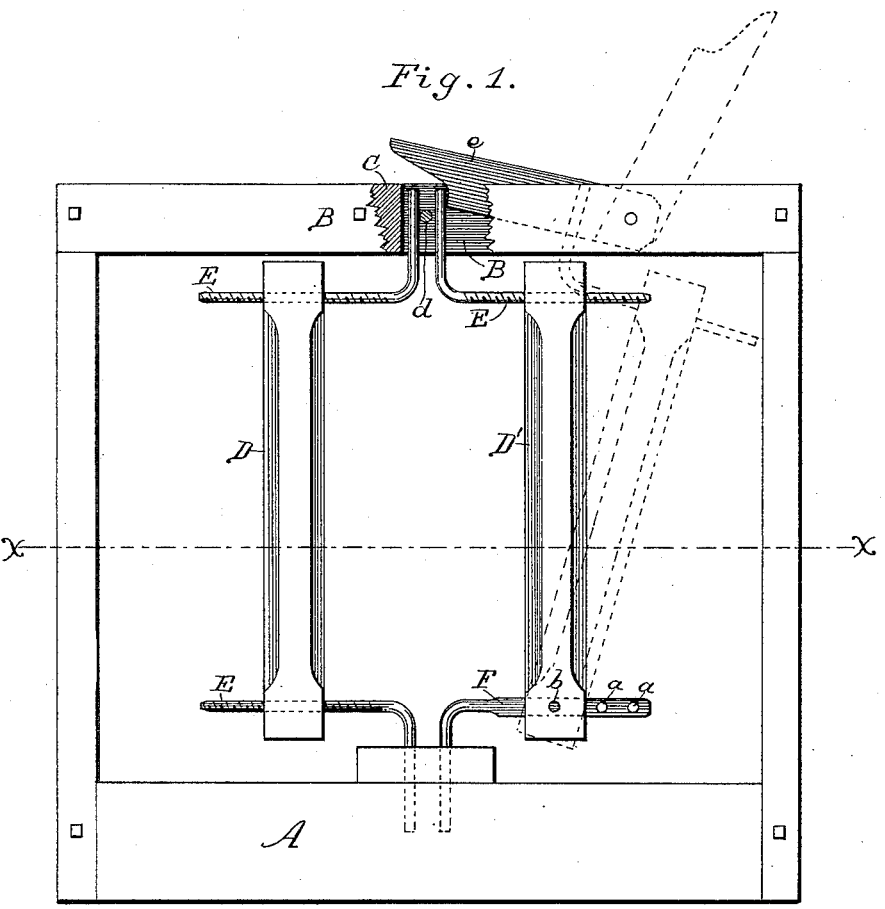
Figure 2:
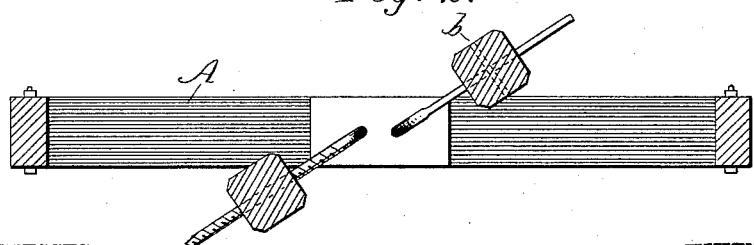

Figure 1 is a front elevation of a pair of stanchions according to my invention, and Fig. 2 is a horizontal section of the same at $x$ $x$ of Fig. 1.

A represents the lower timber, which is usually secured to the stable floor or sills.

B B are a pair of top rails, which are fixed above the necks of the cattle to the stable. These rails are kept apart by means of fixed blocks C.

D D' are vertical bars serving as the stanchions, made shorter than the space between the rails B and timber A, and supported upon hinge-hooks E F. The three hooks E are screw-threaded along one end to screw through the stanchions for the purpose of adjusting the stanchions to cattle of different sized necks by securing the stanchions far apart or near together. The hook ends of these screws entering holes in the beam A, and entering the slot between the rails B, serve as pivots on which the stanchions may swing from side to side, as shown in Fig. 2, to allow the animal more freedom and ease to bend its neck sidewise. This is a great relief to cattle that have the habit of holding their heads to one side while lying at rest.

F represents a similar pivot to the pivots E; but its horizontal arm passes through a slot in the stanchion D', and is provided with holes $a$ and a pin, $b$, instead of a screw to engage the stanchion. This accomplishes a double purpose—first, it permits the stanchion to be adjusted out and in as the screws do; second, the pin $b$ serves as a pivot on which the stanchion D' may be tilted to one side, as shown in dotted lines in Fig. 1, to allow the animal to enter its head between the stanchions or to withdraw it. The upper pivot of stanchion D is kept between a block, $c$, and a pin, $d$. The upper pivot of stanchion D' brings up against the pin $d$, and is then held by a latch, $e$, which is pivoted to the top rails to drop behind the said pivot when it is in a vertical position. This latch is common as a holder for straight-bar stanchions. After the stanchions have once been adjusted to the necks of the animals to be secured, the animals, being let into the stable, readily find their own places, and the farm-boy has only to pass along in front of them and tilt the leaning stanchions to a vertical position, when the latches fall in place and hold them securely.

To let the animals loose, the boy may use a fork-handle to raise the latches, and the animals quickly learn to tilt the loosened stanchions and withdraw their heads.

What I claim as my invention, and desire to secure by Letters Patent, is—

The combination of the sill A, the two top rails B, the stanchion D, the two hooks E, screw-threaded into the said stanchion, the lower hook pivoted in the beam A, the upper hook pivoted between the rails B, the stanchion D', slotted at its lower end, the hook E, screw-threaded into the stanchion and pivoted between the rails B, and the hook F, pivoted at one end in the sill A, provided with holes along its other end, and the pivot $b$, joining the stanchion D' and the hook F, substantially as shown and described, whereby the two stanchions are made adjustable to and from each other, and are both pivoted at top and bottom independent of each other, for the purpose specified.

JACKSON A. BARBER.

Witnesses:
PERRY G. SMITH,
WILLIAM H. VREELAND.